Figure 1:
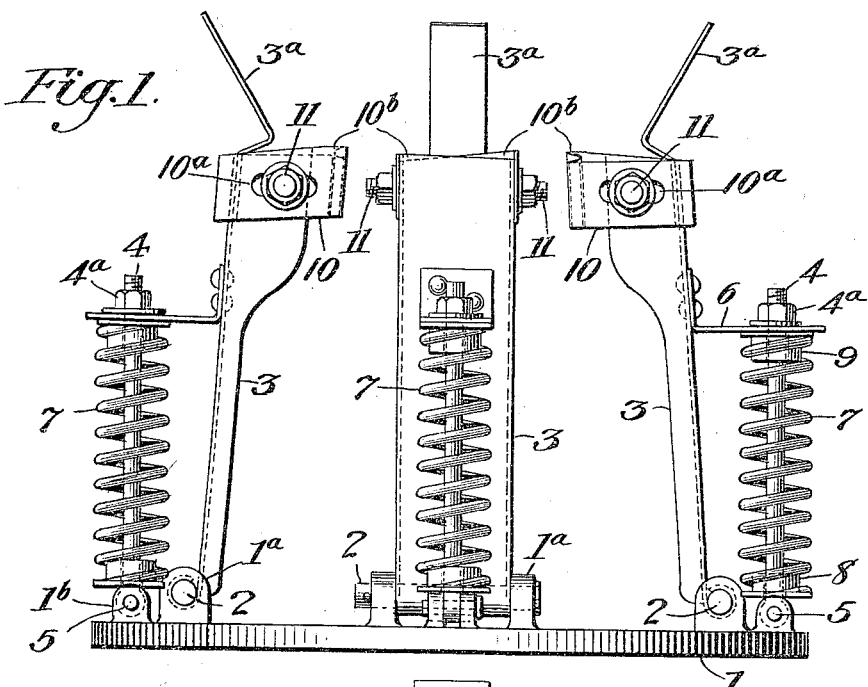

C. W. COOKSON.
PINEAPPLE PEELER.
APPLICATION FILED FEB. 15, 1913.

1,137,841.

Patented May 4, 1915.

Witnesses.

Inventor.
Charles W. Cookson

UNITED STATES PATENT OFFICE.

CHARLES WILLIAM COOKSON, OF WAHIAWA, TERRITORY OF HAWAII.

PINEAPPLE-PEELER.

1,137,841.  Specification of Letters Patent.  Patented May 4, 1915.

Application filed February 15, 1913. Serial No. 748,554.

*To all whom it may concern:*

Be it known that I, CHARLES W. COOKSON, a citizen of the United States, residing at Wahiawa, in the county of Honolulu, Territory of Hawaii, have invented certain new and useful Improvements in Pineapple-Peelers; and I do hereby declare the following to be a full, clear, and exact description of the invention, such as will enable others skilled in the art to which it appertains to make and use the same.

This invention relates to machines for treating fruit, and particularly for peeling the fruit such as pineapples previous to sizing.

The object of the invention is to provide means for separating any desired thickness of the outer skin or rind from fruit of varying size and previous to the sizing operation.

The invention contemplates a plurality of knives curved to form arcs of a circle, preferably having a radius approximately equal to the radius of the fruit of average size to be treated, the cutting edges of which are each adapted to cut a portion of the rind with a shearing cut. These knives are preferably arranged in two sets, one set above the other, such that their edges will overlap in the path of the fruit, in order that the portions of the rind not cut or peeled by the knives of the first set will be cut by the knives of the second set. Each of the knives is preferably adjustably secured to a supporting frame which is hinged at its lower end to the frame of the device such that it may swing toward or from the axis of the machine, its movement toward the axis being limited by a stop, and its movement in the opposite direction being against the action of a spring which tends to push it toward the axis. The object of this arrangement is to permit the knives to follow the contour of the barrel shaped fruit of various sizes. The object of adjustably attaching the knife to its supporting frame is for the purpose of governing the depth cut by the knife, the distance between the knife and its frame being usually made just sufficient to insure of the complete cutting of the eyes of the fruit in that portion of the rind which is engaged by the knife. To produce a shearing cut the cutting edge of each knife may be curved, tapered or inclined, but I do not confine myself to any particular shape of the cutting edge. The upper end of each knife supporting frame is extended upward and outward above the level of the cutting edge of the knife, in order that the fruit when passed through the device may engage these angular extensions and cause said frames to swing away from the axis, against the action of their springs, sufficiently to allow the fruit to pass and the knives to come into play. The pieces of rind cut by each knife pass between the knife and its supporting frame.

Figure 2:
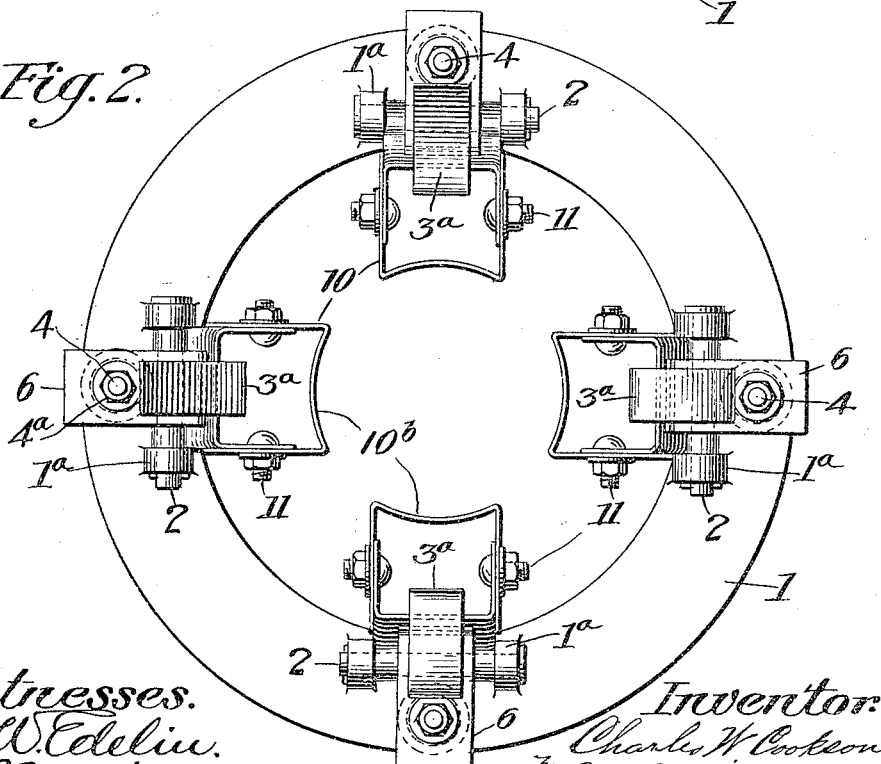

In the accompanying drawings, forming a part of this specification, Figure 1 represents in side elevation a device of the kind described embodying a preferred form of my invention. Fig. 2 is a top plan view of the same.

Referring to the drawings, the ring shaped body or frame 1 is provided with lugs $1^a$ carrying the pins 2 on which the knife supporting frames 3 are pivoted so that they may swing toward or away from the axis of the device. The bolts 4 are hinged on the pins 5 in the lugs $1^b$ of the frame 1, as shown. Each bolt 4 passes through a hole in the plate 6 attached to and projecting outwardly from the knife supporting frame 3. A compression spring 7 is interposed on the bolt 4 between the washers 8 and 9 above the lugs $1^b$ and under the plate 6 respectively. The upper end $3^a$ of each knife supporting frame 3 is bent upward and outward as shown. A knife 10 is adjustably secured to the frame 3 by the bolts 11 which pass through elongated holes $10^a$, such that the curved portion of the knife may be set either closer to or farther away from the frame 3, as desired, so as to alter the space between the knife and the inclined end $3^a$ of the supporting frame 3 and thereby govern the depth cut or thickness of rind which will be cut by said knife. These knives 10 are curved to form arcs of a circle, preferably having a radius equal to that of the fruit of average size to be treated. The upper edge $10^b$ is the cutting edge of each knife 10, and to produce a shearing cut this edge may be of any desired shape, such as curved, tapered or inclined as in Fig. 1 in which one end of the knife 10 is shown higher than the other end.

The swinging of the knife supporting frames 3 toward the axis of the device, and consequently the approach of the knives 10 to one another, is adjustably limited by the position of the nuts $4^a$ on the bolts 4.

In operation, when a fruit is forced downward through the device it first encounters the inclined ends 3ª of the knife supporting frames 3, and the fruit acting as a wedge forces said ends apart to permit the fruit to pass, the frames 3 swinging on the pins 2 away from the axis of the machine, against the action of the springs 7 which are compressed by this movement. The fruit in lowering, however, soon encounters the cutting edges 10ᵇ of the knives 10, each of which peels or cuts with a shearing cut its portion of the outer skin and rind of the fruit as it continues its downward movement, following the longitudinal contour of the barrel shaped fruit, the depth cut by each knife being governed by the setting of the knife 10 with respect to the inclined end 3ª of its supporting frame 3. After the fruit has passed through the device it is then passed through a similar device whose knives peel or cut the remaining uncut portions of the outer skin or rind.

Of course any desired number of knives 10 may be used, although four are illustrated in the drawings.

I claim:

1. A machine for peeling fruit such as pineapples, comprising a frame, a plurality of knife-supports pivotally connected thereto at their lower ends and extending upwardly from their pivotal connections, knives carried by the upper ends of said supports, means associated with said supports and rigidly attached thereto and extending above the knives adapted to be engaged by the fruit to swing said supports and thereby cause the knives to follow the contour of the fruit, and means to yieldingly resist outward swinging movement of the supports.

2. A machine for peeling fruit such as pineapples, comprising a frame, a plurality of knife-supports pivotally connected thereto at their lower ends and extending upwardly from their pivotal connections, knives carried by the upper ends of said supports, means associated with said supports and extending above the knives adapted to be engaged by the fruit to swing said supports and thereby cause the knives to follow the contour of the fruit, laterally projecting elements associated with said supports, and springs interposed between said elements and said frame.

3. A machine for peeling fruit such as pineapples, comprising a frame, a plurality of knife-supports pivotally connected thereto at their lower ends and extending upwardly from their pivotal connections, knives carried by the upper ends of said supports, means associated with said supports and extending above the knives adapted to be engaged by the fruit to swing said supports and thereby cause the knives to follow the contour of the fruit, laterally projecting elements associated with said supports, bolts pivoted to the frame and extending upwardly through said laterally projecting elements, said bolts provided with shoulders above said elements to limit the inward movement of said supports, and springs interposed between said laterally projecting elements and the frame to yieldingly resist outward swinging movement of said supports.

In testimony whereof I affix my signature, in presence of two witnesses.

CHARLES WILLIAM COOKSON.

Witnesses:
ROBT. J. PRATT,
JAMES F. BERRY, Jr.

Copies of this patent may be obtained for five cents each, by addressing the "Commissioner of Patents, Washington, D. C."